United States Patent [19]

Sagefors

[11] Patent Number: 4,474,506
[45] Date of Patent: Oct. 2, 1984

[54] METHOD FOR CONSTRUCTING IN ROCK STORAGE LOCATIONS FOR LIQUID PRODUCTS, FOR EXAMPLE OIL PRODUCTS

[75] Inventor: Ivar K. Sagefors, Stockholm, Sweden
[73] Assignee: Boliden Aktiebolag, Stockholm, Sweden
[21] Appl. No.: 491,323
[22] PCT Filed: Jul. 19, 1982
[86] PCT No.: PCT/SE82/00247
§ 371 Date: Apr. 7, 1983
§ 102(e) Date: Apr. 7, 1983
[87] PCT Pub. No.: WO83/00526
PCT Pub. Date: Feb. 17, 1983

[30] Foreign Application Priority Data

Aug. 7, 1981 [SE] Sweden .................... 8104757

[51] Int. Cl.³ .............................. B65G 5/00
[52] U.S. Cl. ........................ 405/55; 405/53; 405/132
[58] Field of Search ............... 405/52–59, 405/132, 133

[56] References Cited

U.S. PATENT DOCUMENTS

| 26,481 | 12/1859 | Doyere | 405/53 X |
| 2,788,637 | 4/1957 | Benz | 405/53 X |
| 2,871,668 | 2/1959 | Reed | 405/53 X |
| 2,928,248 | 3/1960 | Hubbell | 405/53 |
| 3,068,654 | 12/1962 | Warren | 405/53 |
| 4,045,963 | 9/1977 | Hansson et al. | 405/53 |

FOREIGN PATENT DOCUMENTS

| 627676 | 7/1963 | Belgium | 405/53 |
| 2417449 | 9/1979 | France | 405/55 |
| 218941 | 2/1968 | Sweden | 405/53 |
| 412048 | 2/1980 | Sweden | 405/53 |

OTHER PUBLICATIONS

Energy Facilities Going Underground; pp. 54–57, Civil Engineering-ASCE, Dec. 1978.

Primary Examiner—Dennis L. Taylor
Attorney, Agent, or Firm—Brumbaugh, Graves, Donohue & Raymond

[57] ABSTRACT

Method for constructing a liquid-product storage location in rock formations, said location comprising a first cavity, and a plurality of second cavities located outside the first cavity. In accordance with this method there is first formed a tunnel (7) which slopes from the surface of the ground down to a given point in the rock formation. There is then blasted from said given point a second sloping tunnel (22) which meanders in the ultimate storage location in a plurality of turns down to the level of the bottom (11) of the ultimate first cavity. Horizontal primary tunnels (T1–T6) are then blasted from the meandering tunnel at a plurality of levels. From the primary tunnels there is then blasted at all the aforementioned levels a plurality of horizontal, secondary tunnels which extend towards the site of the ultimate first cavity (1) and define a number of rock stopes (P1–P6), whereafter the first cavity is formed by blasting, in a manner to extend along or to the level of the lowermost parts of the ultimate second cavities (2). Subsequent hereto, there is optionally blasted one or more sloping tunnels, which are directed towards the center of the lowermost part of the first cavity. Subsequent hereto the second cavities are formed by blasting away those rock stopes (P1–P4) located between superimposed secondary tunnels, beginning with the lowermost stope and continuing upwardly in sequence with remaining stopes, the shot rock-mass (16) falling downwardly, optionally through the slide tunnels, being transported to ground level.

10 Claims, 13 Drawing Figures

FIG. II

METHOD FOR CONSTRUCTING IN ROCK STORAGE LOCATIONS FOR LIQUID PRODUCTS, FOR EXAMPLE OIL PRODUCTS

DESCRIPTION

Technical Field

The present invention relates to a method for constructing in rock storage locations for liquid products comprising a first cavity and a plurality of second cavities.

The prime object of the present invention is to provide a storage location which can be constructed or formed in a much shorter time than can previously known storage locations of the kind in question.

Background of the Invention

It is previously known to store liquid products such as petroleum products in subsurface cavities blasted in rock formations. One such known construction comprises one or more cavities in the form of a horizontal tunnel or tunnels, so called loafs, formed in a rock formation by blasting. The blasting of such cavities takes considerable time, and presents a hazard to personnel working in the vicinity of the blasting sight, besides being relatively costly. The introduction of the goods to be stored into a storage location and their removal therefrom requires the provision of complicated pipe installations.

Disclosure of the Present Invention

Thus, the method according to the invention is particularly useful in enabling a large quantity of rock to be removed per unit of time in the construction of large storage locations. It is to be expected that in the future there will be a need for storage locations having a volumetric capacity of $10^6$ cubic meters or more. In the method according to the invention previously known rock-chamber blasting principles and mining principles and knowledge gathered from previous rock-blasting and mining operations are combined to provide a method which will fulfill those requirements placed on the construction of large storage locations with respect to time saving, cost and working environment. In storage locations constructed by the method according to the invention the ceiling or roof area of the storage location will be much smaller than the roof or ceiling area of known storage locations, and only a minor part of the volume of the location need be strengthened, which depends on the fact that no one need stay in the cavity or chamber when it has been blasted. Further, when practicing the method according to the invention the major part of the shot-rock can be removed without the assistance of vehicles which generate troublesome exhaust gases, thereby providing a better working environment. The form or construction of the storage location according to the invention will also be optimal with respect to the heaviest oil grades. The goods to be stored can be introduced into the storage location and removed therefrom through relatively simple pipe installations. These characteristic features enables the method according to the invention to be carried out in a much shorter time and at much lower costs than previously known storage locations of the kind in question.

Thus the invention relates to a method for constructing a liquid-product storage location in rock formations, said location comprising a first cavity, and a plurality of second cavities located outside the first cavity. In accordance with the invention, the method of constructing such a storage location is characterized by first forming a tunnel which slopes from the surface of the ground down to a given point in the rock, and blasting from said given point a second, sloping tunnel which meanders in the ultimate storage location in a plurality of turns down to the level at which the bottom of the first cavity will ultimately be situated; by blasting at a plurality of levels from the meandering tunnel horizontal, primary tunnels; by blasting from said primary tunnels at all said levels a plurality of horizontal, secondary tunnels which extend towards the site of the ultimate first cavity; by blasting said first cavity and by bringing it by means of a separate tunnel to extend up to the level of the ground, whereby said first cavity extends substantially along the level of the lowermost parts of the ultimate second cavities; by optinally constructing in the first cavity and said separate tunnel a transporting device which extends to the level of the ground, and by means of which device shot rock-mass can be transported from said first cavity and by then forming said second cavities by blasting away those rock stopes located between superimposed secondary tunnels, beginning with the lowermost stope and remaining stopes being blasted in sequence from beneath upwardly, the shot rock-mass falling downwardly, being brought to said separate tunnel for transport to ground level.

One preferred embodiment of the invention comprises a first cavity having the form of a vertical shaft, and a plurality of second cavities located outside the first cavity. In accordance with the invention, the method of constructing such a storage location is characterized by first forming a tunnel which slopes from the surface of the ground down to a given point in the rock, and blasting from said given point a second, sloping tunnel which extends helically around the ultimate storage location in a plurality of turns of progressively decreasing radius down to the level at which the bottom of the first cavity will ultimately be situated; by blasting at a plurality of levels from the helical tunnel horizontal, circulary primary tunnels which extend around the ultimate first cavity or void; by blasting from said circulary primary tunnels at all said levels a plurality of horizontal, radial secondary tunnels which extend radially inwardly towards the site of the ultimate first cavity; by blasting said first cavity in a manner to cause a part thereof to extend up to the level of the ground, and to extend downwardly to a bottom level located beneath the level of the lowermost parts of the ultimate second cavities; by blasting from the lowermost part of each of the ultimate second cavities one or more sloping tunnels, hereinafter referred to as slide tunnels, such that said tunnel or tunnels is or are directed towards the centre of the lowermost part of the first cavity; by constructing in the first cavity a transport shaft which extends to the level of the ground, and supporting said shaft by support means secured in the surrounding rock; by arranging on the surface of the ground a transport machinery by means of which transport containers arranged in the transport shaft can be lowered to the lowermost part of the first cavity to a position in front of respective mouths of said slide tunnels; by optinally blasting for each of the ultimate second cavities one or more vertical shafts which extend along the height of the ultimate second cavity and are connected at the bottom thereof with one of said slide tunnels; and by then forming said second cavities by blasting away those rock stopes located between superimposed radial tunnel, beginning with the lowermost stope and remaining stops being blasted in sequence from beneath upwardly, the shot rock-mass falling downwardly, through said slide tunnels, and being conducted into a transport container, which is then lifted up through said lift shaft to ground level. In addition to the aforementioned transport containers, one or more personnel lifts may be arranged in the shaft, to enable the storage location to be inspected during its construction. Pipes for pumping the liquid-goods to be stored into and out of the storage location can also be arranged in the lift shaft.

Another preferred embodiment of the invention comprises a first cavity having the form of a vertical shaft, and a plurality of second cavities located outside the first cavity. In accordance with the invention, the method of constructing such a storage location is characterized by first forming a tunnel which slopes from the surface of the ground down to a given point in the rock, and blasting from said given point a second, sloping tunnel which extends helically around the ultimate storage location in a plurality of turns of progressively decreasing radius down to the level at which the bottom of the first cavity will ultimately be situated; by blasting at a plurality of levels horizontal, circulary primary tunnels which extend around the ultimate first cavity or void; by blasting from said circulary primary tunnels at all said levels a plurality of horizontal, radial secondary tunnels which extend radially outwardly from the site of the ultimate first cavity; by blasting said first cavity in a manner to cause a part thereof to extend up to the level of the ground, and to extend downwardly to a bottom level located beneath the level of the lowermost parts of the ultimate second cavities; by blasting from the lowermost part of each of the ultimate second cavities one or more sloping tunnels, hereinafter referred to as slide tunnels, such that said slide tunnel or tunnels is or are directed towards the centre of the lowermost part of the first cavity; by constructing in the first cavity a transport shaft which extends to the level of the ground, and supporting said shaft by support means secured in the surrounding rock; by arranging on the surface of the ground transport machinery be means of which transport containers arranged in the transport shaft can be lowered to the lowermost part of the first cavity to a position in front of respective mouths of said slide tunnels; by optionally blasting for each of the ultimate second cavities one or more vertical shafts which extend along the height of the ultimate second cavity and are connected at the bottom thereof with one of said slide tunnels; and by then forming said second cavities by blasting away those rock stopes located between superimposed radial, secondary tunnels, beginning with the lowermost stope and remaining stopes being blasted in sequence from beneath upwardly, the shot rock-mass falling downwardly, through said slide tunnels, and being conducted into a transport container, which is then lifted up through said transport shaft to ground level.

A further preferred embodiment of the invention comprises a first cavity having the form of a horizontal tunnel, and a plurality of second cavities located outside the first cavity. In accordance with the invention, the method of constructing such a storage location is characterized by first forming a tunnel which slopes from the surface of the ground down to a given point in the rock, and blasting from said given point a second, sloping tunnel which meanders in the ultimate storage location in a plurality of turns down to the level at which the bottom of the first cavity will ultimately be situated; by blasting at a plurality of levels from the meandering tunnel horizontal, primary tunnels which extend above the ultimate first cavity or void; by blasting from said primary tunnels at all said levels a plurality of horizontal, secondary tunnels directed substantially perpendicularly to said primary tunnels; by blasting said first cavity and bringing said first cavity by means of a separate tunnel to extend up to the level of the ground whereby said first cavity extends substantially along the level of the lowermost parts of said ultimate second cavities; by blasting from the lowermost part of each of the ultimate second cavities one or more sloping tunnels, hereinafter referred to as slide tunnels, such that said tunnel or tunnels is or are directed towards the centre of the first cavity; by optionally constructing in the separate tunnel a transporting device which extends to the level of the ground, by means of which device blasted rock-mass being transported up from said first cavity, and by then forming said second cavities by blasting away those rock stopes located between superimposed secondary tunnels, beginning with the lowermost stope and remaining stopes being blasted in sequence from beneath upwardly, the shot rock-mass falling downwardly, through said slide tunnels, is transported to said separate tunnel for transport to ground level.

Another, further preferred embodiment of the invention comprises a first cavity having the form of a horizontal tunnel, and a plurality of second cavities located outside the first cavity. In accordance with the invention, the method of constructing such a storage location is characterized by first forming a tunnel which slopes from the surface of the ground down to a given point in the rock, and blasting from said given point a second, sloping tunnel which meanders the ultimate storage location in a plurality of turns down to the level at which the bottom of the first cavity will ultimately be situated; by blasting at a plurality of levels from the meandering tunnel horizontal, primary tunnels which extend parallel to the ultimate first cavity; by blasting from said primary tunnels at all said levels a plurality of horizontal, secondary tunnels which extend substantially perpendicularly to said primary tunnels; by blasting said first cavity and bringing said first cavity by means of a separate, vertical tunnel to reach in contact with the level of the ground whereby said first cavity extends substantially along the level of the lowermost parts of the ultimate secondary cavities; by blasting from the lowermost part of each of the ultimate second cavities one or more connecting tunnels, such that said connecting tunnel or tunnels is or are directed towards the centre of the lowermost part of the first cavity; by constructing in the separate vertical tunnel a transporting device which extends to the level of the ground, and by then forming said second cavities by blasting away those rock stopes located between superimposed secondary tunnels, beginning with the lowermost stope and remaining stopes being blasted in sequence from beneath upwardly, the shot rock-mass falling downwardly, and being transported through said first cavity and said separate tunnel to ground level, whereby rock is left to surround said first cavity and to provide basis for a minor ultimate pipeline comprising tunnel.

Other characterizing features of the method according to the invention will be apparent from the following claims and description, which description is made with reference to the accompanying drawings.

The different embodiments of the method according to the invention provide i.a. second cavities of different form, and/or first cavities of different form.

Figure 1:
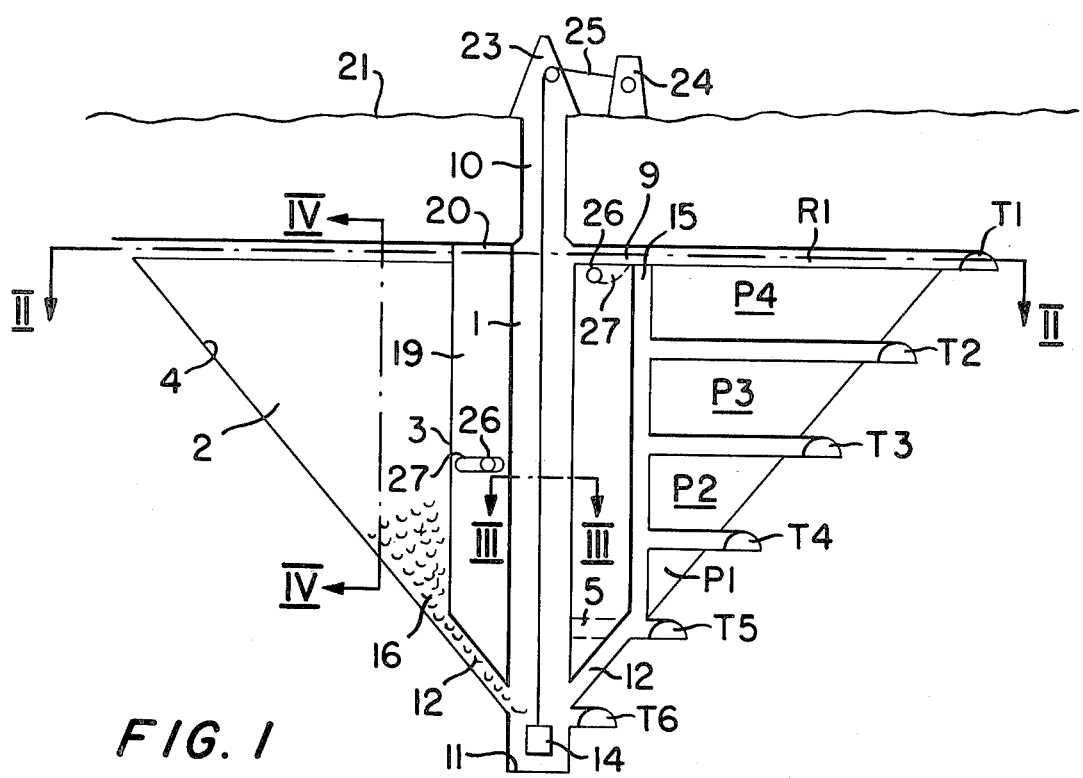
FIGS. 1–3 illustrate a first embodiment of the method according to the invention.
Figure 2:
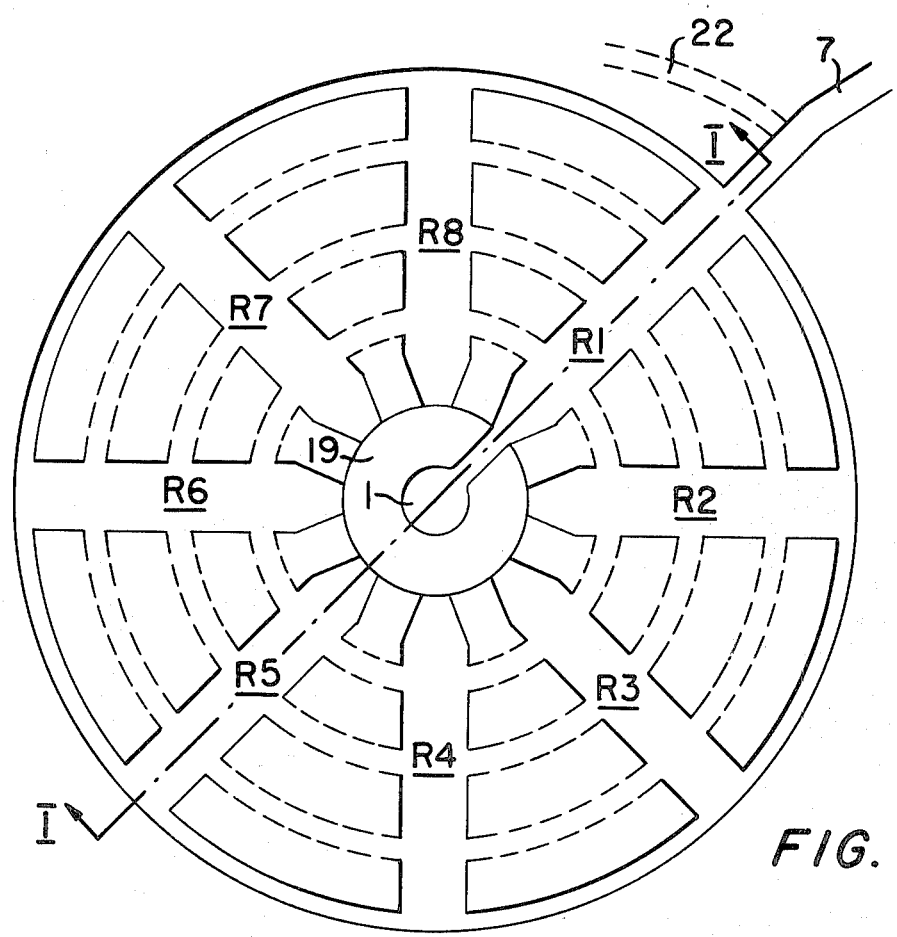

FIG. 1 is a vertical sectional view of the storage location taken on the line I—I in FIG. 2.

FIG. 2 is a horizontal sectional view of the storage location taken on the line II—II in FIG. 1.

Figure 3:
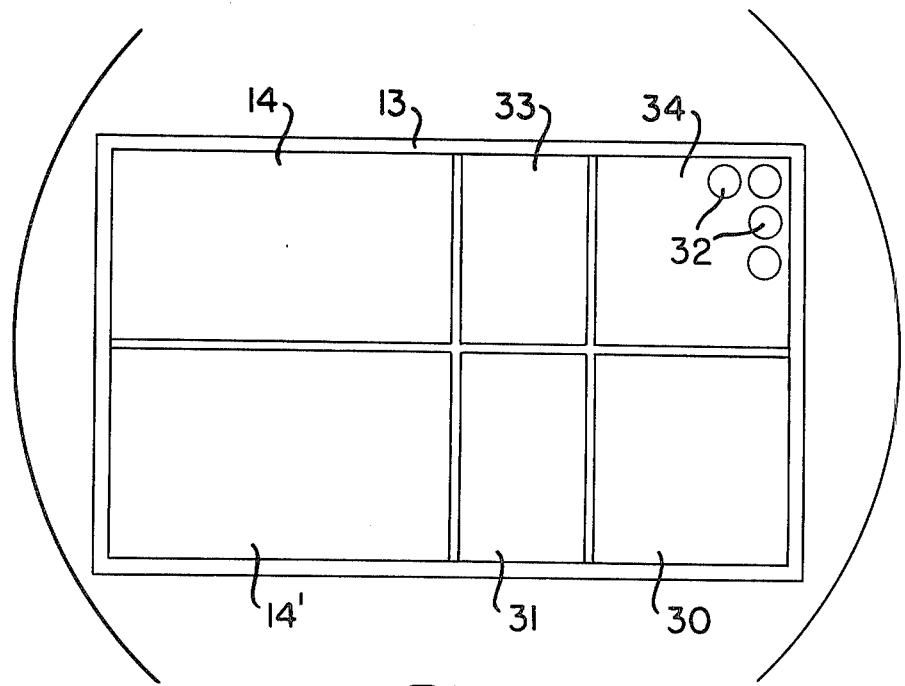

FIG. 3 is a horizontal sectional view in larger scale, taken on the line III—III in FIG. 1.

When constructing the storage location, there is first blasted a tunnel 7 which slopes from the surface of the ground, down to a given point in the rock formation. There is then blasted from said given point a second, sloping tunnel 22 which extends helically around the ultimate storage location in a number of turns, of decreasing radius, down to the level of the bottom 11 of an ultimate first cavity or void. There is then blasted from the helical tunnel, at a plurality of mutually different levels, horizontal primary tunnels T1–T6 which extend in respective rings around the ultimate storage location. Horizontal secondary tunnels R1–R8 are then blasted from these circulary primary tunnels at all of said levels, said tunnels R1–R8 extending radially inwardly towards the site of the ultimate first cavity 1, there being blasted at each level one such radial tunnel for each of the ultimate second cavities 2. For each of the ultimate second cavities 2, one of said radial tunnels, 9, extends through into the site for the first cavity 1, while the remaining radial tunnels are terminated short of the ultimate first cavity 1. The aforementioned through-passing tunnels 9 are located at different levels at different ones of the second cavities 2. The first cavity 1 is then formed by blasting, and a part 10 of said first cavity 1 is caused to extend up to ground level and to extend downwardly to a bottom level 11 located beneath the level of the lowermost parts of the ultimate second cavities 2. There is then blasted from the lowermost part of each of the ultimate second cavities 2 a sloping tunnel 12 which extends towards the centre of the lowermost part of the first cavity 1. These sloping tunnels 12 are hereinafter referred to as slide tunnels. In the first cavity 1 there is constructed a lift shaft 13, which extends up to ground level and which is supported by support means secured in the surrounding rock. The lift shaft 13 can be constructed from pre-fabricated pipes which are lowered down to the first cavity. Arranged for movement in the lift shaft 13 are two transport containers 14 and 14' (see FIG. 3). The transport containers 14 and 14' are suspended on steel-wire ropes and are operated by means of lift machinery located on the surface of the grounds, or in a cavity (formed in a mountain) which is on a level higher than level of the ground. This cavity may be connected to the surroundings by means of a tunnel, through which the shot rock lifted from the blasting site can be removed by means, for example, of trucks.

There is then blasted in each of the ultimate second cavities 2 a vertical shaft 15 (raised shaft) which extends in the proximilty of the innermost wall of the second cavity 2, from the lowermost part of the cavity up to the uppermost of said radial tunnels. The second cavities 2 are then formed by blasting away the rock stopes P1–P4 located between the superimposed radial horizontal tunnels in each of the ultimate second cavities 2, beginning with the lowermost stope P1 and continuing with the remaining stopes P2–P4 in sequence, beginning from the bottom and working upwardly, the shot rock-mass 16 (FIG. 1) falling downwardly, through the slide tunnel 12, and being conducted into a transport container 14, which is then lifted up through the lift shaft 13 to ground level. One of the second cavities 2, in which all rock stopes P1–P4 have been removed by blasting, is illustrated on the left in FIG. 1, the resultant shot rock 16 sliding down through the void and the slide tunnel 12. The sloping outermost wall 4 of each of the second cavities 2, and also the slide tunnels 12, are inclined to the horizontal at an angle which is equal to or slightly greater than the angle of repose of the shot rock-mass. In order to accelerate the rate at which the shot rock falls, jets of water under high pressure can be directed along the sloping walls of the cavities. These jets can be produced from water cannons introduced into the radial tunnels.

As illustrated in FIGS. 3, the lift shaft 13 may be divided into a number of part shafts. In the illustrated embodiment, two of these part shafts have transport containers 14 and 14' arranged for movement therein, while a third part shaft 30 is provided with a personnel lift or elevator, and a fourth part shaft 31 is provided with a stairway. A fifth part shaft 33 can be used as a reserve shaft. A sixth part shaft 34 may have arranged therein vertically extending pipes 32, for pumping liquid goods to be stored into and out of the storage location. Lift cages 14 and 14' and the personnel lifts are connected to lift machinery located at ground level by means of steel-wire rope, said lift machinery comprising a housing 23 with idle rollers and a housing 24 provided with a winch connected to the lift cages by means of ropes 25. The lift machine can be operated automatically, so that when one lift cage 14 is being lowered the other lift cage 14' is lifted, and vice versa. The pipes 32 may be provided with horizontal branch pipes located at different levels and extending towards the horizontal tunnels 9, which extend radially through concrete pillar 19 towards the second cavities 2. At said levels, baths 27 are formed in rock pillar 19 at different levels by blasting, and are provided with pumps 26. The reason why a plurality of pumps are provided at different levels is because the rise height is too great to pump the liquid goods with the use of a single pump. Instead of the illustrated baths and pumps, there can be arranged one or more lower pump rooms outside an artificial water curtain, in a previously known manner.

When the second cavities 2 have been completed and the shot rock-mass removed, the first cavity 1 and the interspace around the lift shaft 13 can be filled with concrete.

In order to increase the available storage space, the cavities 2 can be provided with side walls which diverge outwardly, so that when seen in cross section the cavity obtains a sector-like configuration.

When the goods to be stored, for example oil, are introduced into the storage location, the oil will rise from the bottom upwardly. The gas located above the surface of the oil will thus be compressed. This gas may be an inert gas introduced into the storage location before introducing said oil thereinto, and may comprise, for example, carbon dioxide generated by burning oil. The gas above the surface of the oil will be compressed. In order to prevent a cushion of compressed gas being formed beneath the roof of the cavity, there can be arranged in the proximity of the level of the ceiling of said cavity a hole which extends into the first cavity and which discharges into pipes leading to a scrubber, in which the gas is washed, or to a condensal means, and from there out to ambient air.

A second embodiment of the method according to the invention will now be described with reference to FIGS. 4–6.

Figure 4:
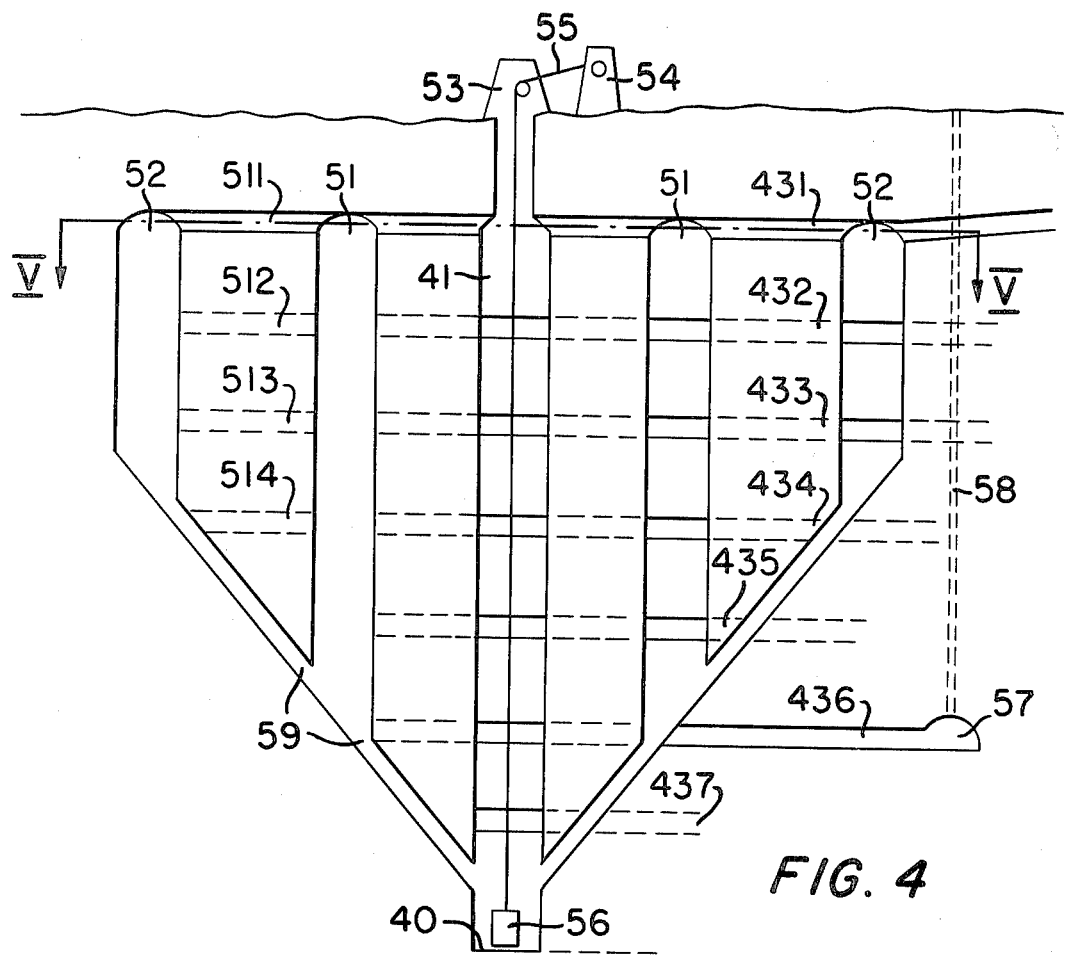
FIGS. 4–6 illustrate a second embodiment of the method according to the invention.
Figure 5:
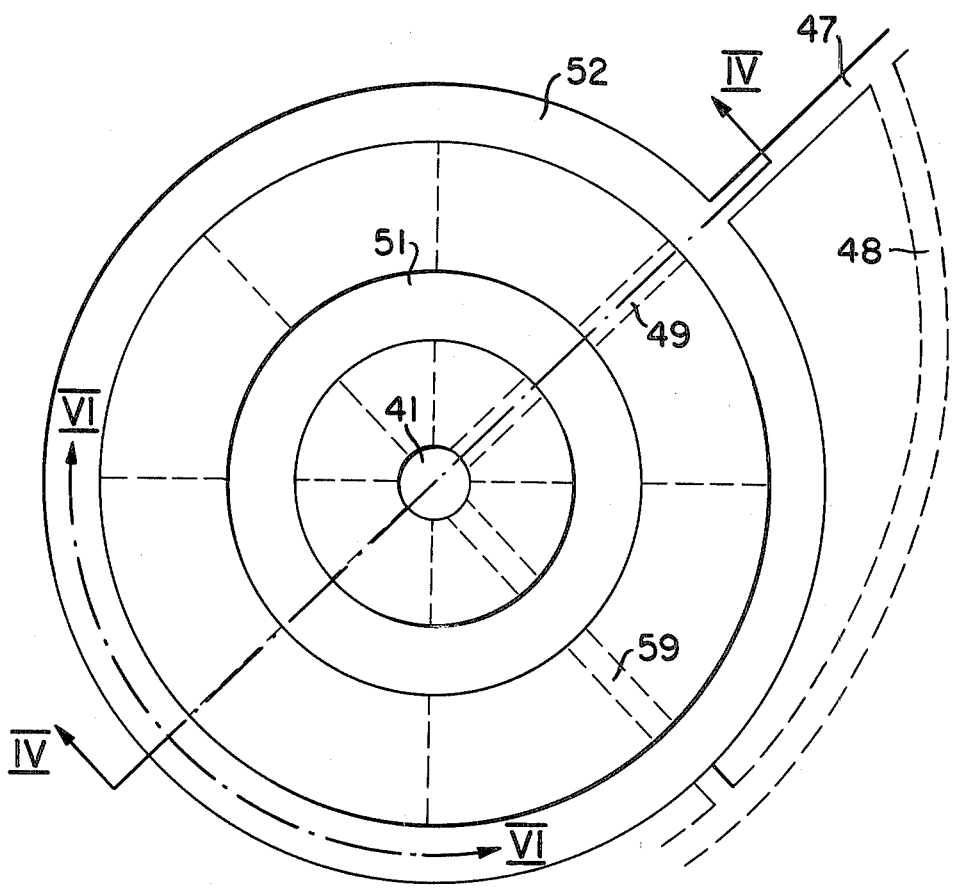

FIG. 4 is a vertical sectional view of a storage location taken on the line IV—IV in FIG. 5.

FIG. 5 is a horizontal sectional view taken on the line V—V in FIG. 4.

Figure 6:
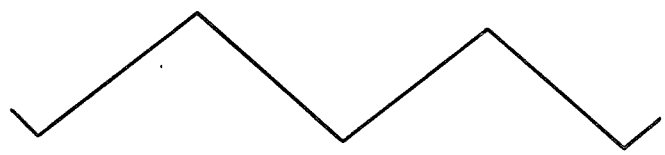

FIG. 6 is vertical sectional view taken along the circle-arcuate line VI—VI in FIG. 5.

As with the previously described embodiment, there is first formed a tunnel 47 which slopes from the surface of the ground down to a given point in the rock formation. A sloping tunnel 48 is then blasted in the rock at said given point, said tunnel extending helically around the ultimate storage location in a plurality of turns of decreasing radius, down to the level of the bottom 40 of an ultimate first cavity 41. A plurality of horizontal tunnels extending from the helical tunnel 48 are then formed at a plurality of different levels by blasting, said horizontal tunnels extending in a ring around the ultimate storage location. Horizontal tunnels 431–437 and 511–517 are then formed by blasting at all of said levels, said horizontal tunnels extending from the circulary tunnels radially inwardly towards the site of the ultimate first cavity 41. The cavity 41 is then formed by blasting. In this embodiment, each of the so-called second cavities are caused to extend circulary around the first cavity, so that when seen in horizontal section each second cavity had the form of a circular ring, said second cavities being concentrical with one another and with the vertical centre line passing through the first cavity. Two such circular cavities are referenced 51 and 52 in FIGS. 4 and 5.

The first cavity 41 is now formed by blasting, the shot rock being carried away through the radial tunnels 431–437 etc. and the helical tunnel 48, by means of, for example, trucks. The first cavity 41 is so formed that a part 50 thereof extends up to ground level and down to a bottom level 40. As with the previously described embodiment, there is arranged in the cavity 41 a lift shaft having arranged therein transport containers 56 suspended on steel wire ropes and operated by means of lift machinery 53, 54, 55 located at ground level. A plurality of sloping tunnels 49 and 59 are then formed by blasting or drilling operations, these tunnels forming slide tunnels and extending along the bottom level of each of the second cavities 51, 52, and being directed towards the centre of the lowermost part of the first cavity 41. In FIG. 5, some of the slide tunnels 49–59 are simply shown by dotted lines. The second cavities 51, 52 are then formed by blasting, the rock stopes formed between the blasted radial tunnels 431–436 being removed by blasting. For the purpose of blasting the major part of each second cavity, the bottoms of said cavities, when seen in peripheral vertical section, are given a saw-toothed configuration (FIG. 6) with a radial slope, permitting shot material to slide freely, and with the lowermost locations of said bottoms located in front of said slide tunnels. When seen in horizontal section, these slide tunnels are located beneath the beforementioned horizontal radial tunnels. The shot rock-mass slides through the slide tunnels and is conducted down into a transport container 56 located in front of the discharge ends of the slide tunnels, said container 56 being hoisted to ground level through the lift shaft. As with the previously described embodiment, prior to blasting the major part of the second cavities there can be arranged in said cavities a plurality of vertical shafts which extend along the height of the second cavity and which discharge at the bottom thereof into said slide tunnels. The aforementioned rock stopes are then removed by blasting, beginning with the lowermost stope and continuing progressively upwardly, the shot rock-mass first sliding through said vertical shaft and, as blasting continues, through the sloping bottom of the cavity and then through the slide tunnels.

As illustrated in FIG. 4, one (436) of the lowermost radial tunnels is extended to a pump house 57 located outside the storage location, said pump house 57 communicating with the surface of the ground through a vertical bore 58. Arranged in the pump house 57 is a pump (not shown) which is connected to the storage location through a pipeline in tunnel 436 and which communicates with the ground surface through a pipeline in the bore 58. This pump is intended for use when removing stored goods from the storage location.

Figure 7:
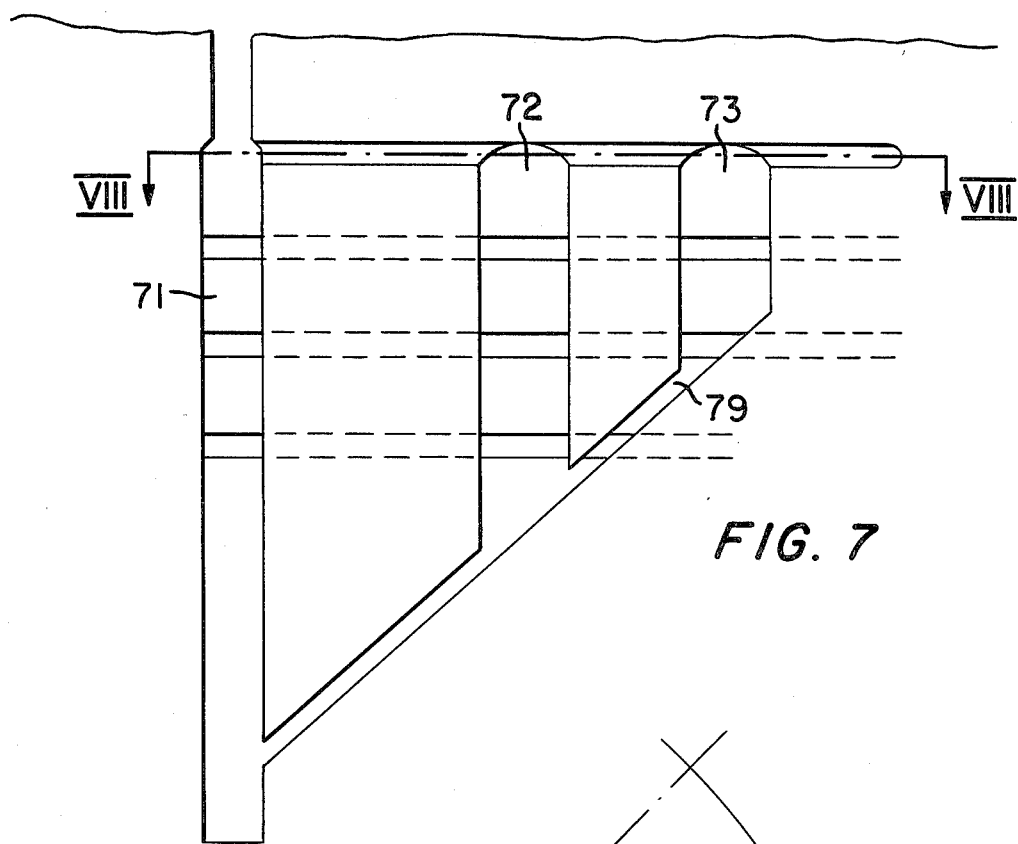
FIGS. 7 and 8 illustrate a third embodiment of the method according to the invention.
Figure 8:
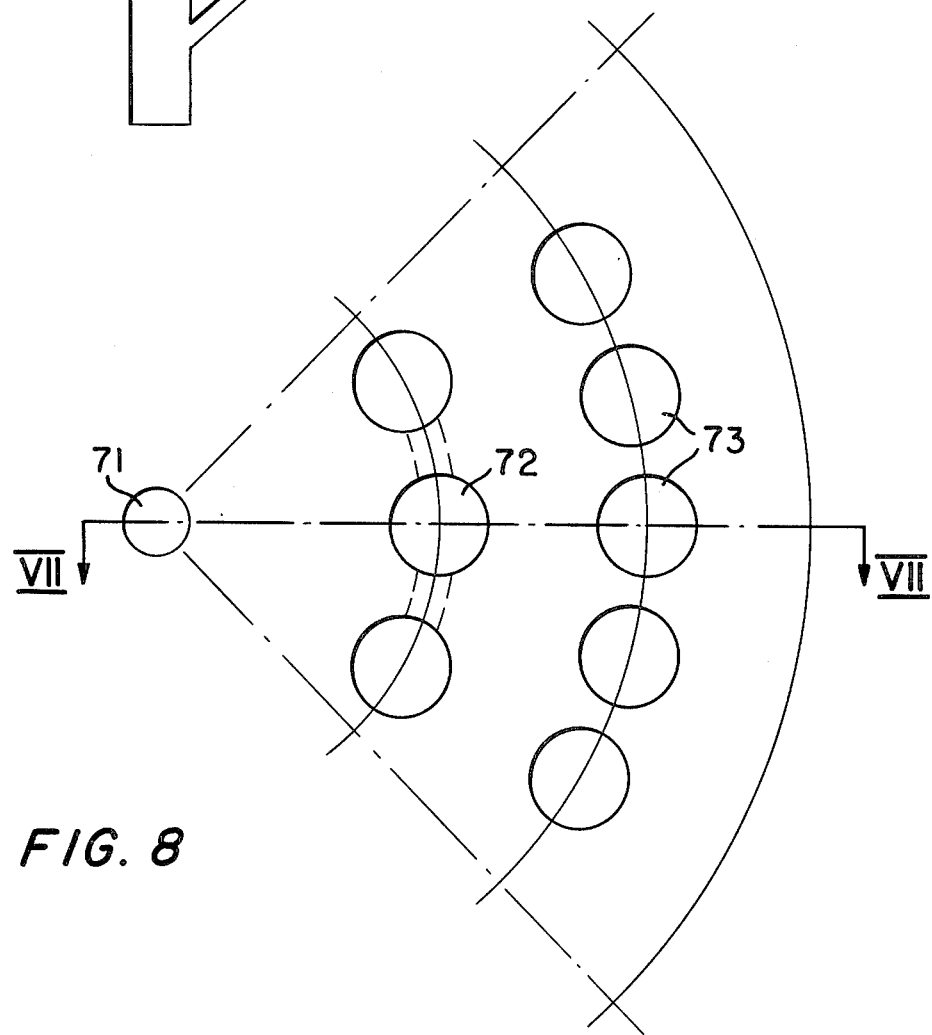

A third embodiment of the method according to the invention is illustrated in FIGS. 7 and 8.

FIG. 7 is a vertical sectional view of a part of the finished storage location, taken on the line VII—VII in FIG. 8.

FIG. 8 is a horizontal, sectorshaped part-sectional view taken on the line VIII—VIII in FIG. 7.

As with the previously described embodiments, there is first formed a tunnel which slopes from ground level to a given point in the rock formation. There is then formed a sloping tunnel which extends from said given point helically around the ultimate storage location in several turns, with decreasing radius down to the level of the bottom of the ultimate first chamber, which is designated 71 in FIGS. 7 and 8. Horizontal, circulary primary tunnels are then formed by blasting at different levels from said helical tunnel, and horizontal secondary tunnels extending radially inwardly towards the site of the ultimate first cavity 71 are then formed by blasting from said circulary tunnels. Construction of the storage location is continued in substantially the same manner as that described with reference to the earlier embodiments. One difference is that the second cavities are blasted in the form of a plurality of vertical shafts, these cavities being divided into groups 72 and 73 and the cavities in each group being arranged with their centres in a circle which is concentrical with the first cavity, the circles of different groups being concentrical with one another and the vertical centre line of each such second cavity meeting one of said slide tunnels 79. Although the vertical cavities 72 and 73 have been shown in the drawing to have a horizontal circular cross-section it will be understood that said cavities may have an oval cross-section or a polygonal cross-section.

Blasting of the cavities and removal of the shot rockmass is effected in the same manner as that described with reference to the earlier embodiments.

Figure 9:
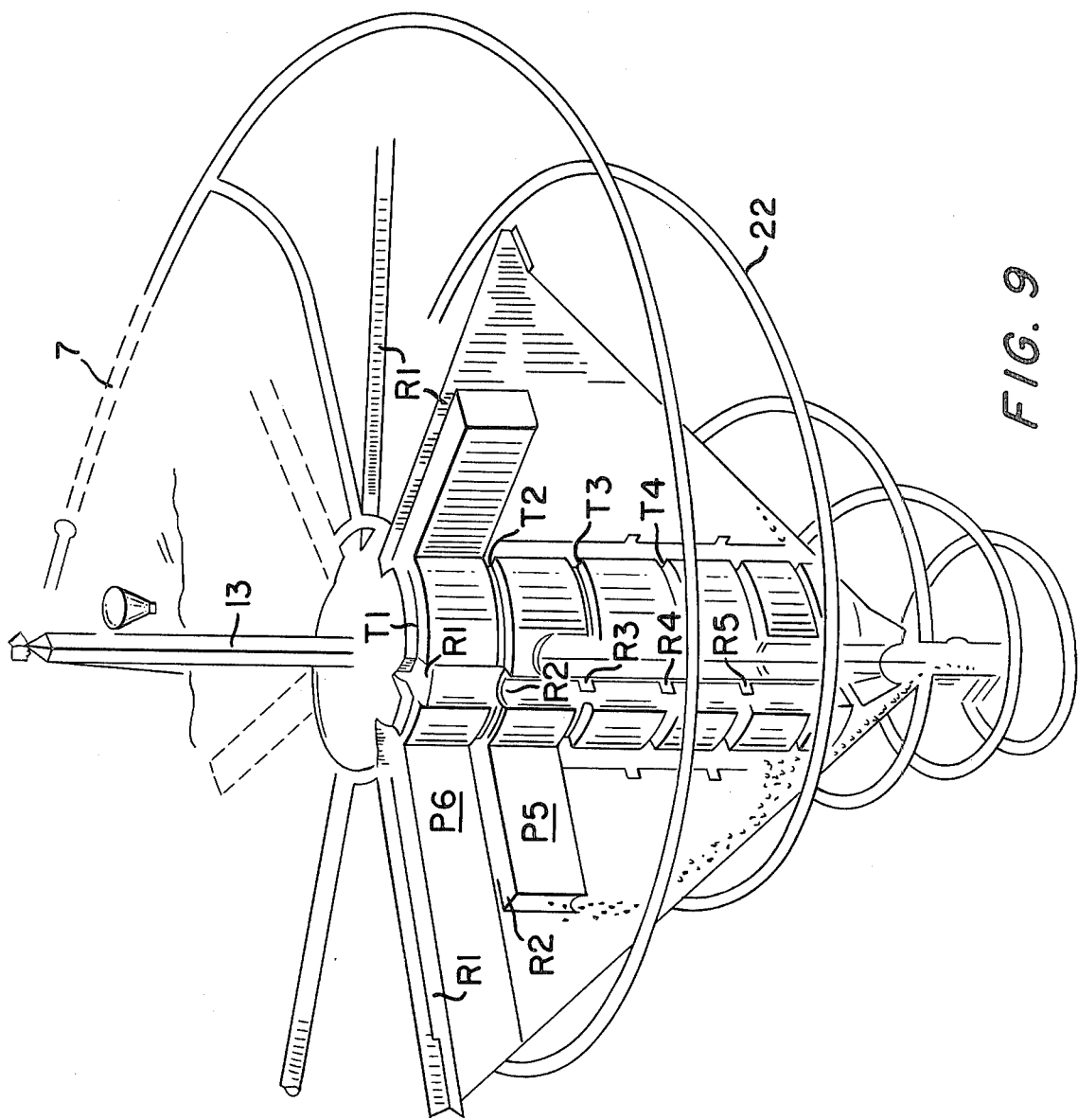
FIG. 9 illustrates a fourth embodiment of the method according to the invention.

FIG. 9 shows a vertical perspective view of a fourth embodiment.

When constructing the storage location, there is first blasted a tunnel 7 which slopes from the surface of the ground, down to a given point in the rock formation. There is then blasted from said given point a second, sloping tunnel 22 which extends helically around the ultimate storage location in a number of turns, of decreasing radius, down to the level of the bottom 11 of an ultimate first cavity or void. There is then blasted around the centre of the storage site at a plurality of mutually different levels, horizontal primary tunnels T1-T6 which extend in respective rings around the ultimate storage location. Horizontal secondary tunnels R1-R6 are then blasted from these circulary tunnels at all of said levels, said tunnels R1-R6 extending radially outwardly from the site of the ultimate first cavity 1, there being blasted at each level one such radial tunnel for each of the ultimate second cavities 2. For each of the ultimate second cavities 2, one of said radial tunnels, 9, extends through into the site for the first cavity 1, while the remaining radial tunnels can be terminated short of the ultimate first cavity 1. The aforementioned through-passing tunnels 9 are located at different levels at different ones of the second cavities 2. The first cavity 1 is then formed by blasting, and a part 10 of said first cavity 1 is caused to extend up to ground level and to extend downwardly to a bottom level 11 located beneath the level of the lowermost parts of the ultimate second cavities 2. There is then blasted from the lowermost part of each of the ultimate second cavities 2 a sloping tunnel 12 which extends towards the centre of the lowermost part of the first cavity 1. These sloping tunnels 12 are referred to as slide tunnels. In the first cavity 1 there is as described above constructed a lift shaft 13.

There is then optionally blasted in each of the ultimate second cavities 2 a vertical shaft 15 (raised shaft) which extends in the proximity of the innermost wall of the second cavity 2, from the lowermost part of the cavity up to the uppermost of said radial tunnels. The second cavities 2 are then formed by blasting away the rock stopes P1-P4 located between the superimposed radial horizontal tunnels in each of the ultimate second chambers 2, beginning with the lowermost stope P1 and continuing with the remaining stopes P2-P4 in sequence, beginning from the bottom and working upwardly, the shot rock-mass 16 (FIG. 1) falling downwardly, through the slide tunnel 12, as hereinbefore described and transported away up to ground level.

Figure 10:
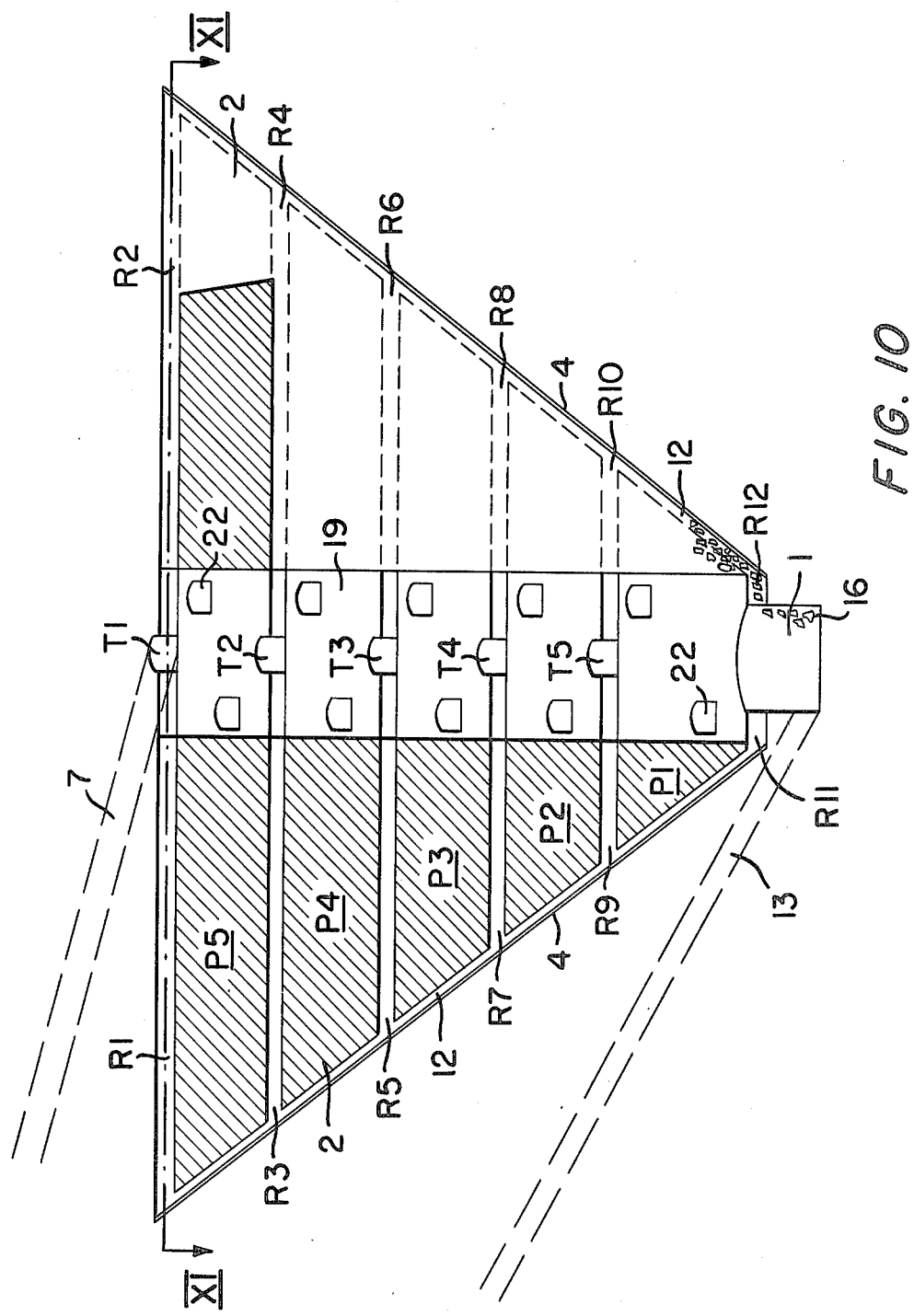
FIGS. 10 to 12 illustrate a fifth embodiment of the method according to the invention.
Figure 11:
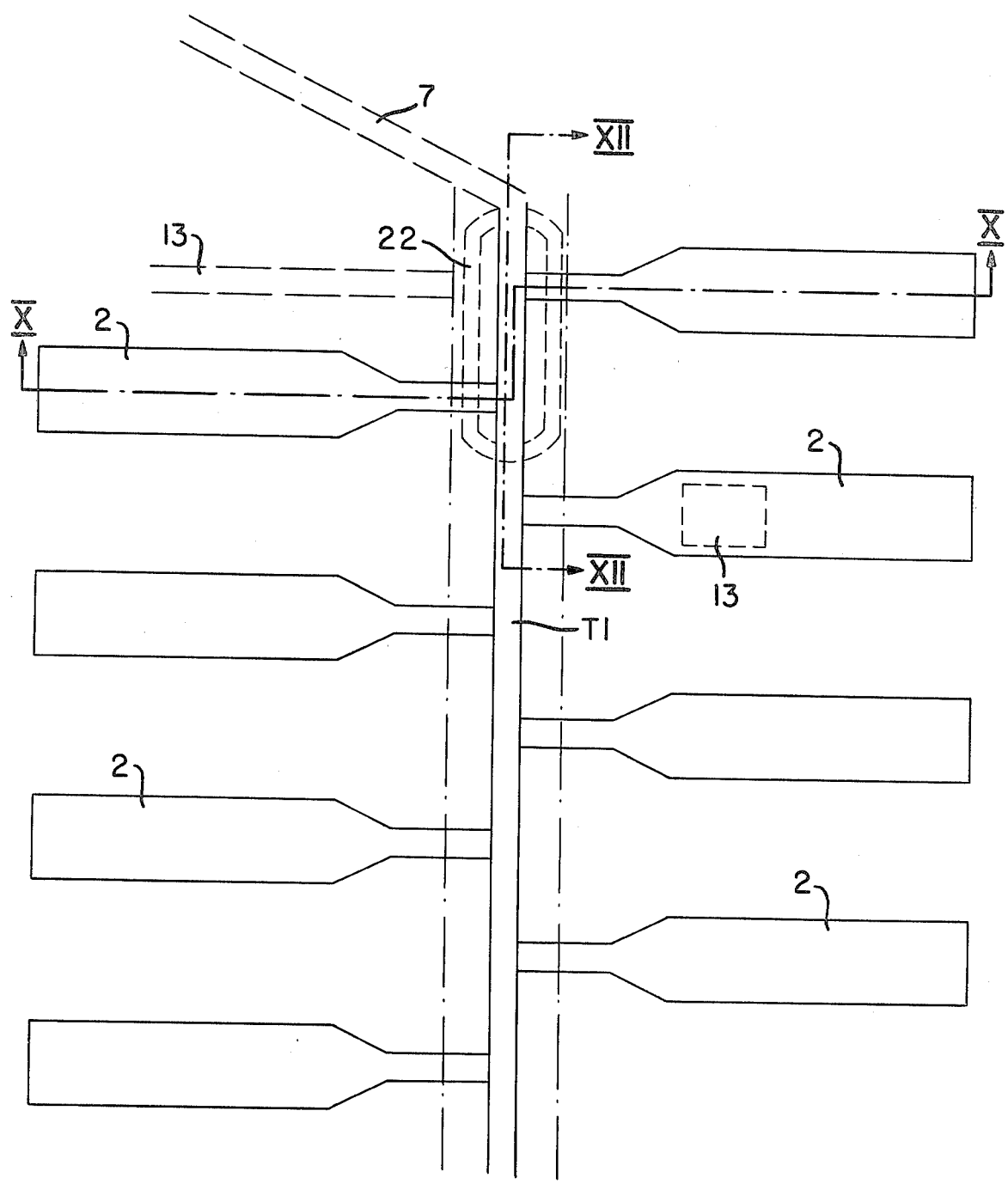
Figure 12:
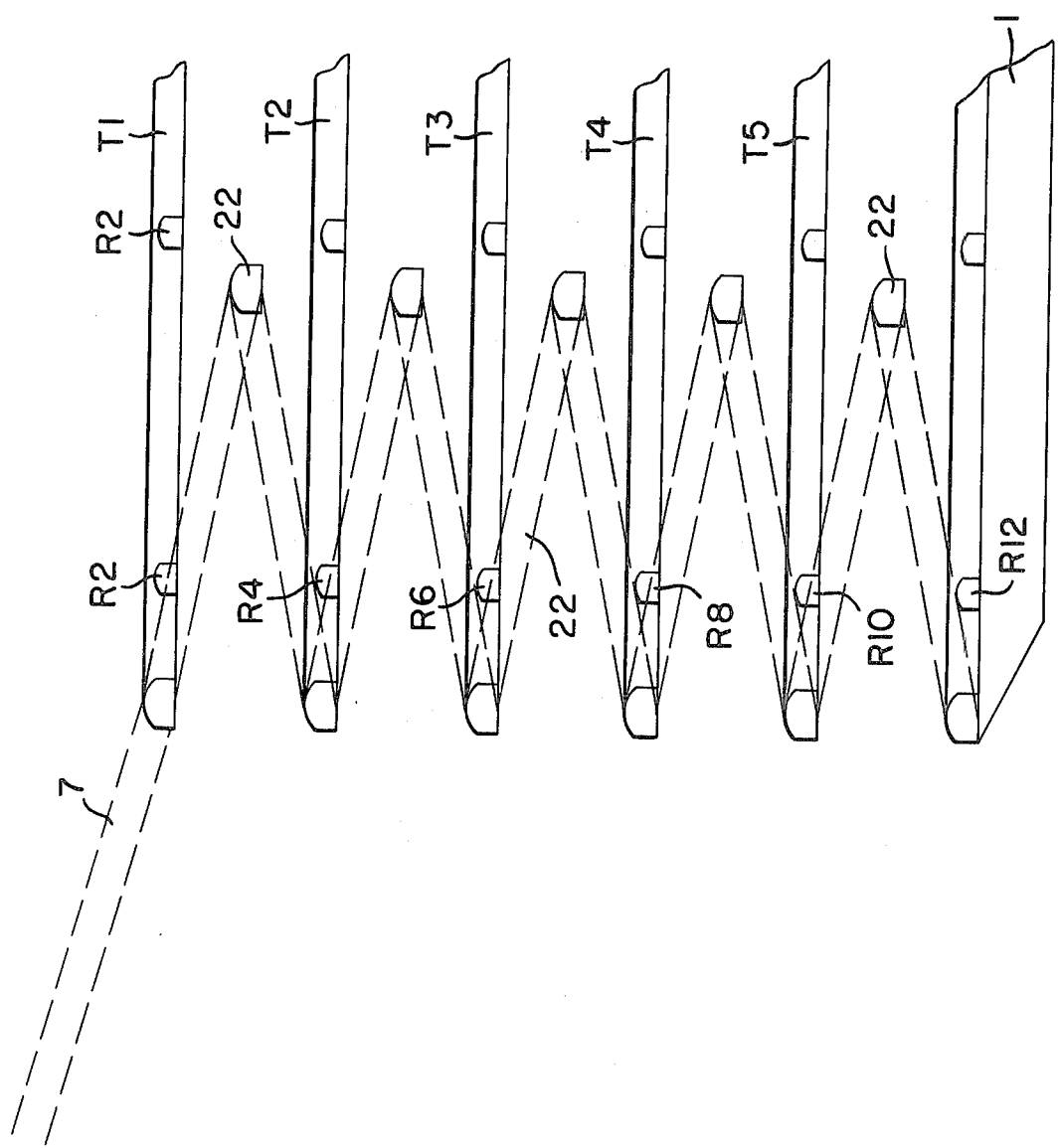

FIG. 10 shows a vertical section of a fifth embodiment;

FIG. 11 shows a sectional view along line XI—XI in FIG. 10;

FIG. 12 shows a sectional view along line XII—XII in FIG. 11.

When constructing the storage location, there is first blasted a tunnel 7 which slopes from the surface of the ground, down to a given point in the rock formation. There is then blasted from said given point a second, sloping tunnel 22 which meanders in the ultimate storage location in a number of turns, down to the level of the bottom 11 of an ultimate first cavity. There is then blasted from the meandering tunnel 22, at a plurality of mutually different levels, horizontal primary tunnels T1-T5 which extend along the full length of the ultimate storage location. Horizontal secondary tunnels R1-R12 are then blasted from these primary tunnels T1-T5 at all of said levels, said tunnels R1-R12 extending perpendicularly towards the primary tunnels T1-T5, there being blasted at each level one such secondary tunnel for each of the ultimate second cavities. The first cavity 1 is then formed by blasting, and a part 13 of said first cavity 1 is caused to extend up to ground level. There is then blasted from the lowermost part of each of the ultimate second cavities 2 a sloping tunnel 12 which extends towards the centre of the lowermost part of said second cavities being at a higher level than the lowermost part of the first cavity 1. These sloping tunnels 12 are referred to as slide tunnels. In one of theultimate second cavities there can be constructed a lift shaft 13, which extends up to ground level and which is supported by support means secured in the surrounding rock. The lift shaft 13 can be constructed as hereinbefore described. The second cavities 2 are then formed by blasting away the rock stopes P1-P5 located between the superimposed horizontal secondary tunnels R1-R12 in each of the ultimate second cavities 2, beginning with the lowermost stope P1 and continuing with the remaining stopes P2-P4 in sequence, beginning from the bottom and working upwardly and from out inwardly, the shot rock-mass 16 (FIG. 10) falling downwardly, through the slide tunnel 12, and being conducted into a transport container 14, which is then lifted up through the lift shaft 13 to ground level or transported in the sloping tunnel 13 by truck. One of the second cavities 2, in which almost all rock stopes P1-P5 have been removed by blasting, is illustrated on the right in FIG. 10, the resultant shot rock 16 sliding down through the void and the slide tunnel 12. The sloping outermost wall 4 of each of the second cavities 2, and also the slide tunnels 12, are inclined to the horizontal at an angle which is equal to or slightly greater than the angle of repose of the shot rock-mass. In order to accelerate the rate at which the shot rock falls, jets of water under high pressure can be directed along the sloping walls of the cavities. These jets can be produced from water cannons introduced into the radial tunnels.

Figure 13:
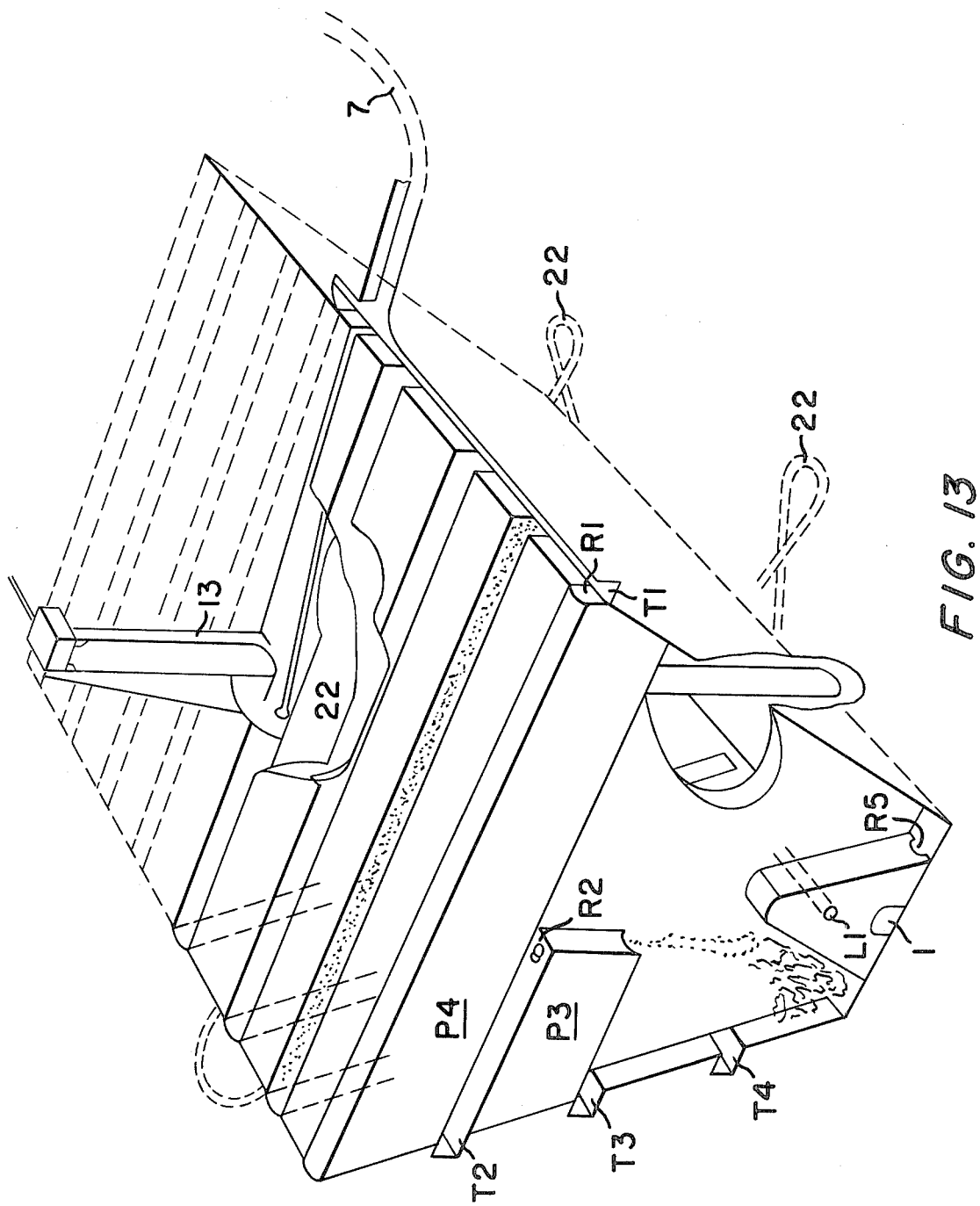
FIG. 13 illustrates a sixth embodiment of the method according to the invention.

FIG. 13 shows a perspective sectional fragmented view through a sixth embodiment of the invention.

In this embodiment the meandering tunnel 22 meanders perpendicularly to the longitudinal axis of the ultimate storage site. I.e. it meanders mainly perpendicularly to the way the same tunnel (22) of FIG. 10 meanders. From this meandering tunnel 22 (FIG. 13) primary tunnels (T1-T4) are blasted at each given level and perpendicularly to the meandering tunnel (22), i.e. parallel to the longitudinal axes of the storage site. Said tunnels T1-T4 run parallel to, and above, but in each separate vertical planes, the ultimate first cavity 1 situated in the bottom of the site. Said tunnels T1-T4 run in such a way that they touch the sloping side of each ultimate second cavity 2, whereby they in future form inspectious sites when the storage is not filled with liquid. Secondary tunnels R1-R5 are blasted at each level into each ultimate second cavities, whereby the lowermost tunnel R5 is placed at the same level as the bottom of the first cavity 1, and leads into said first cavity.

The stopes P1-P4 between the respective secondary tunnels are then blasted beginning with the lowermost stope P1 and continuing with the remaining stopes P2-P4 in sequence. In this embodiment rock in the form of a hump is left around the first cavity 1 to protect it, whereby shot rock is transported out through said first cavity via said lowermost secondary tunnel R5. Blasting of the stopes is carried out after a drilling of holes which are loaded with explosives. The drilling of holes takes generally place from above and downwardly whereby, however, the first stope P1 may be drilled from beneath, from the tunnel R5, and upwardly. Having blasted the first stope P1 and transported away the shot rock via the tunnel R5 and the first cavity 1 drilling and blasting continues whereby the shot rock falls downwardly on each side of the hump protecting the first cavity 1.

In said hump a smaller horizontal tunnel L1 is blasted. From this tunnel L1 vertical holes (not shown) are drilled into the first cavity at the site of each second cavity 2. Through said tunnel L1 and said drilled vertical holes pipelines are arranged to provide for a filling and emptying of the second cavities via the tunnels R5.

The second cavities are in this embodiment as well as the embodiments hereinbefore described separated from each other with interlaying rock formations, whereby the thickness of each is dependent on the rock mechanic situation. Thereby, when arranging a number of parallel second cavities as in the embodiments of FIGS. 10 and 13, and particularly the latter, in rocks of weaker characteristics stabilizing horizontal pillars may be arranged between the walls to impose a stabilizing effect.

When transporting away the shot rock in the first cavity trucks, diesel or electrical, or endless conveyor belts can be used up to a lift or a conveyor belt running up to ground level. The different ways of transporting the shot rock-mass to the ground level is not restricted but can be chosen due to the different factors to be considered.

In one of the centre rock blocks left between the second cavities a vertical transport shaft 13 is arranged.

The primary tunnels T1–T4 are arranged at the outer periphery of the storage site, whereby they can be arranged on alternative sides of the site depending on the meandering tunnel and on the levels where the secondary tunnels R1–R4 are wanted.

The method according to the invention affords the following important advantages.

Available rock formations can be well utilized. A large storage space can be formed in a restricted area. A restricted area can be more readily protected against the sinking of surface water, which is of great importance from an environmental aspect. An artificial water curtain can be readily provided, by boring holes through the horizontal circulary tunnels, and by filling the holes with water under pressure. The manner in which the storage location is constructed enables optimal blasting techniques to be used. The costs of strengthening the resultant storage location are less than was previously the case. In the case of relatively good rock qualities, only limited reinforcement is required, this being met by spraying concrete onto the walls or ceilings of the cavities. If the rock is of very high quality, such reinforcement can probably be omitted. One important advantage is that the first cavity 1, 41, 71 (centre shaft) can be completed first, which makes it possible to commence, and to complete, installations of lift shafts, pumps and pipes while the remaining cavities 2 are being blasted. Since the storage location has a long vertical extension, the stored product will flow more readily to the pumps. The storage location affords better operational conditions when storing oil on water beds arranged at the bottom of the storage location, since the volume of the water bed will be extremely small and the contact surface between the stored goods and the surface of the water will also be small, which results in a decrease in bacteria formation. This is particularly so with reference to the embodiments of the second cavities shown in FIGS. 1, 9, 10 and 13, wherein said cavities have the form of a triangle with an apex thereof pointing downwards. Sludge and solid particles in the stored goods sink downwardly, and can be collected in a relatively large space beneath the level of the lower parts of the second cavities 2. Furthermore, if large quantities of sludge settle, there are good possibilities of recovering the sludge, which may contain valuable products.

As will be evident from the aforegoing, blasting of the various rock chambers is mainly effected by socalled caving, gravitational forces being utilized to move the shot rock to a lift, which is then transported to ground level. This makes it possible to operate continuously and to save much time, and also to construct the storage location at relatively low costs. Flaps can be arranged at the lowermost openings of the slide tunnels, the flaps being designed to swing outwardly to form inclined surfaces directed towards the transport container, so as to guide the falling debris into said container. The number of second cavities provided may be smaller than that illustrated in the drawings, and neither need the cavities be arranged symmetrically in relation to an imaginary centre line through the storage location. If the area available for the storage location is limited and/or if the rock is of poor quality, it can be sufficient to form said second cavities solely on one side of a vertical diametrical plane, or in rock of good quality, and still obtain a sufficiently large storage space. Neither need the vertical shaft forming the first cavity be of horizontal circular cross-section, as illustrated in the drawings, but may have an oval or polygonal cross-section.

The storage location constructed by means of the method according to the invention can also be used for the storage of mutually different products which must not be mixed with each other. This can be achieved by blocking the tunnels interconnecting the cavities, for example, by means of valves or concrete blocks cast at suitable locations, and by connecting different pipelines to the thus formed separate departments of the storage location.

The six mutually different, aforedescribed embodiments of the method according to the invention as a result provide second cavities of mutually different form. The form selected depends upon the quality of the rock in which the storage location is to be constructed.

I claim:

1. A method for constructing a liquid-product storage location in rock formations, said location comprising a first cavity, and a plurality of second cavities located outside said first cavity, characterized by first forming a tunnel (7) which slopes from the surface of the ground down to a given point in the rock formation; blasting from said given point a second sloping tunnel (22, 48) which meanders in the ultimate storage location in a plurality of turns down to the level of the bottom (11, 41) of the ultimate first cavity (1, 41, 71); blasting at a plurality of levels from the meandering tunnel (22) horizontal, primary tunnels (T1–T6); blasting from said primary tunnels (T1–T6) at all said levels a plurality of horizontal, secondary tunnels (R1–R12) which extend towards the site of the ultimate first cavity (1, 41, 71); by blasting said first cavity and by bringing it by means of a separate tunnel (10, 13) to extend up to the level of the ground, whereby said first cavity (1, 41, 71) extends substantially along or to the level of the lowermost parts of the ultimate second cavities (2, 51, 52, 72, 73); constructing in the first cavity (1, 41, 71) and said separate tunnel (10, 13) optionally a transporting device (14) which extends to the level of the ground, and by means of which device shot rock-mass can be transported from said first cavity; and by then forming said second cavities by blasting away those rock stopes (P1–P4) located between superimposed secondary tunnels, beginning with the lowermost stope and continuing upwardly in sequence with remaining stopes, the shot rock-mass (16) falling downwardly, being brought to said separate tunnel for transport to ground level.

2. A method according to claim 1, said location comprising a first cavity having the form of a vertical shaft, and a plurality of second cavities located outside said first cavity, characterized by first forming a tunnel (7) which slopes from the surface of the ground down to a given point in the rock formation; blasting from said given point a second sloping tunnel (22, 48) which extends helically around the ultimate storage location in a plurality of turns of progressively decreasing radius down to the level of the bottom (11, 41) of the ultimate first cavity (1, 41, 71); blasting at a plurality of levels from the helical tunnel (22) horizontal, circulary primary tunnels (T1–T6) which extend around the ultimate first cavity; blasting from said circularly primary tunnels at all said levels a plurality of horizontal, radial secondary tunnels (R1–R8) which extend radially inwardly towards the site of said first cavity (1, 41, 71); forming said first cavity in a manner to cause a part (10, 56) thereof to extend up to the level of the ground, and to extend downwardly to a bottom level (11, 40) located beneath the level of the lowermost parts of the ultimate second cavities (2, 51, 52, 72, 73); blasting from the lowermost part of each of the ultimate second cavities and upwardly along an ultimate side (4) of each of said second cavities one or more sloping tunnels, hereinafter called slide tunnels (12, 49, 59, 79), which are directed towards the centre of the lowermost part of the first cavity; constructing in the first cavity a transport shaft (13), which extends to the level of the ground, and supporting said shaft by support means secured in the surrounding rock; arranging on the surface of the ground a transporting machinery (23, 24), by means of which transport containers (14, 14') arranged in the transport shaft can be lowered to the lowermost part of the first cavity to a position in front of respective mouths of said slide tunnels; blasting for each of the ultimate second cavities one or more vertical shafts (15) which extend along the height of the ultimate second cavity and which are connected to the bottom thereof with one of said slide tunnels; and by then forming said second cavities by blasting away those rock stopes (P1–P4) located between superimposed radial tunnels, beginning with the lowermost stope and continuing upwardly in sequence with remaining stopes, the shot rock-mass (16) falling downwardly, through said slide tunnels, and being conducted into a transport container, which is then hoisted up through said transport shaft to ground level.

3. A method according to claim 1, said location comprising a first cavity having the form of a vertical shaft, and a plurality of second cavities located outside said first cavity, characterized by first forming a tunnel (7) which slopes from the surface of the ground down to a given point in the rock formation; blasting from said given point a second sloping tunnel (22, 48) which extends helically around the ultimate storage location in a plurality of turns of progressively decreasing radius down to the level of the bottom (11, 41) of the ultimate first cavity (1, 41, 71); blasting at a plurality of levels horizontal, circulary primary tunnels (T1–T6) which extend around the ultimate first cavity; blasting from said circularly primary tunnels (T1–T6) at all said levels a plurality of horizontal, radial secondary tunnels (R1–R8) which extend radially outwardly from the site of said first cavity (1, 41, 71); forming said first cavity in a manner to cause a part (10, 56) thereof to extend up to the level of the ground, and to extend downwardly to a bottom level (11, 40) located beneath the level of the lowermost parts of the ultimate second cavities (2, 51, 52, 72, 73); blasting from the lowermost part of each of the ultimate second cavities and upwardly along an ultimate side (4) of each of said second cavities one or more sloping tunnels, hereinafter called slide tunnels (12, 49, 59, 79), which are directed towards the centre of the lowermost part of the first cavity; constructing in the first cavity (1, 41, 71) a transport shaft (13) which extends to the level of the ground, and supporting said shaft by support means secured in the surrounding rock; arranging on the surface of the ground transport machinery (23, 24), by means of which transport containers (14, 14') arranged in the transport shaft can be lowered to the lowermost part of the first cavity to a position in front of respective mouths of said slide tunnels; by optionally blasting for each of the ultimate second cavities one or more vertical shafts (15) which extend along the hight of the ultimate second cavity and which are connected to the bottom thereof with one of said slide tunnels; and by then forming said second cavities by blasting away those rock stopes (P1–P4) located between superimposed radial secondary tunnels, beginning with the lowermost stope and continuing upwardly in sequence with remaining stopes, the shot rock-mass (16) falling downwardly, through said slide tunnels, and being conducted into a transport container, which is then hoisted up through said transport shaft to ground level.

4. A method according to claim 1, said location comprising a first cavity having the form of a horizontal tunnel, and a plurality of second cavities located outside said first cavity, characterized by first forming a tunnel (7) which slopes from the surface of the ground down to a given point in the rock formation; blasting from said given point a second sloping tunnel (22) which meanders in the ultimate storage location in a plurality of turns down to the level of the bottom (11) of the ultimate first cavity; blasting at a plurality of levels from the meandering tunnel horizontal, primary tunnels (T1–T6) which extend above the ultimate first cavity (1); blasting from said primary tunnels at all said levels a plurality of horizontal, secondary tunnels (R1–R12) extending substantially perpendicularly to said primary tunnels; by blasting said first cavity (1) and bringing said first cavity by means of a separate tunnel (13) to extend up to the level of the ground, whereby said first cavity (1) extends substantially along the level of the lowermost parts of the ultimate second cavities (2); by blasting from the lowermost part of each of the ultimate second cavities and upwardly along an ultimate side of each of said second cavities (2) one or more sloping tunnels, hereinafter called slide tunnels (12), which are directed towards the centre of the lowermost part of the first cavity; by optionally constructing in the separate tunnel a transporting device by means of which device shot rock-mass can be transported which extends to the level of the ground, up from said first cavity; and by then forming said second cavities by blasting away those rock stopes (P1-P4) located between superimposed secondary tunnels (R1-R12), beginning with the lowermost stope and continuing upwardly in sequence with remaining stopes, the shot rock-mass (16) falling downwardly, through said slide tunnels, being transported to said first cavity and separate tunnel for transport to ground level.

5. A method according to claim 1, said location comprising a first cavity having the form of a horizontal tunnel, and a plurality of second cavities located outside said first cavity, characterized by first forming a tunnel (7) which slopes from the surface of the ground down to a given point in the rock formation; blasting from said given point a second sloping tunnel (22) which meanders in the ultimate storage location in a plurality of turns down to the level of the bottom (11) of the ultimate first cavity; blasting at a plurality of levels from the meandering tunnel horizontal, primary tunnels (T1-T4) which extend parallel to and above the ultimate first cavity; by blasting from said primary tunnels at all said levels a plurality of horizontal, secondary tunnels (R1-R4) which extend substantially perpendicularly to said primary tunnels; blasting said first cavity and bringing said first cavity by means of a separate vertical tunnel to extend up to the level of the ground, whereby said first cavity extends substantially along the level of the lowermost parts of the ultimate second cavities (2); blasting from the lowermost part of each of the ultimate second cavities one or more connecting tunnels (R5), which are directed towards the centre of the lowermost part of the first cavity (1); constructing in the separate vertical tunnel a transporting device which extends to the level of the ground; and by then forming said second cavities by blasting away those rock stopes (P1-P4) located between super-imposed secondary tunnels, beginning with the lowermost stope and continuing upwardly in sequence with remaining stopes, the shot rock-mass (16) falling downwardly, and being transported through said first cavity and said separate tunnel to ground level.

6. A method according to any one of claims 1-5, characterized by arranging in said transport shaft one or more personel lifts (30) and pipelines (32) for pumping the liquid product to be stored into and out of said storage location.

7. A method according to claim 2, characterized by causing each of said second cavities (2) to extend radially outwardly from said first cavity (1) and by giving said cavities a horizontal cross-sectional shape of rectangular or sector-shape configuration, and a vertical longitudinal section having the form of a triangle with one of its apex directed downwardly towards one of said slide tunnels (12), one side of said triangle being vertical and located adjacent said first cavity, while another of said sides of said triangle slopes away from said first cavity.

8. A method according to any one of claims 1-5, characterized by diverging the side walls of each of said second cavities outwardly, so that each such cavity has a sector-like shape when seen in horizontal cross-section.

9. A method according to claim 2 or 3, characterized by causing one of said radial horizontal tunnels (R1-R8) at each of said levels to extend into the ultimate first chamber (1), said through-passing tunnels (9) being formed at mutually different levels for different ones of said second cavities (2).

10. A method according to claim 4, characterized in that the meandering tunnel forms partly the primary tunnels (T1-T6) at each level.

* * * * *